No. 625,959. W. H. SAART. Patented May 30, 1899.
BRACELET.
(Application filed Feb. 9, 1899.)
(No Model.)
*Fig. 1.*
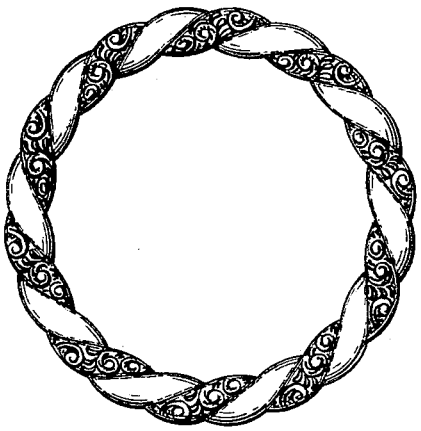
*Fig. 2.*
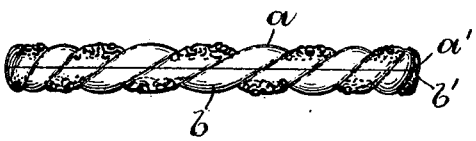
*Fig. 3.*      *Fig. 4.*
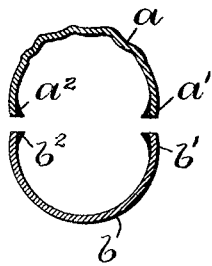 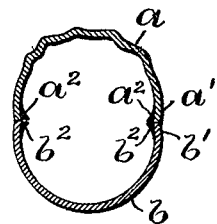
*Fig. 5.*
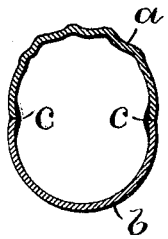
WITNESSES:
Chas. H. Luther Jr
B. M. Simms.
INVENTOR:
William H. Saart
by Joseph A. Miller & Co.
Attys.

UNITED STATES PATENT OFFICE.

WILLIAM H. SAART, OF ATTLEBOROUGH, MASSACHUSETTS, ASSIGNOR TO THE JAMES E. BLAKE COMPANY, OF SAME PLACE.

BRACELET.

SPECIFICATION forming part of Letters Patent No. 625,959, dated May 30, 1899.

Application filed February 9, 1899. Serial No. 705,094. (No model.)

*To all whom it may concern:*

Be it known that I, WILLIAM H. SAART, of Attleborough, in the county of Bristol and State of Massachusetts, have invented a new and useful Improvement in Bracelets; and I hereby declare that the following is a full, clear, and exact description of the same, reference being had to the accompanying drawings, forming part of this specification.

This invention has reference to an improvement in sheet-metal bracelets; and it consists in the peculiar and novel construction whereby two blanks are stamped up into the desired form and united to form the bracelet, as will be more fully set forth hereinafter.

Figure 1 is a side view showing the finished bracelet. Fig. 2 is an edge view of the same. Fig. 3 is a transverse sectional view of the two parts of the bracelet. Fig. 4 is a transverse sectional view showing the two parts of the bracelet in contact with each other. Fig. 5 is a transverse sectional view of the bracelet, showing the two parts united together.

In the drawings, $a$ indicates one half of the bracelet, and $b$ the other half of the same. These two halves $a$ and $b$ are stamped up in suitable dies, forming two concavo-convex, circular, oval, octagonal, or other shaped rings, the adjoining edges of which accurately correspond with each other in their dimensions and configurations. The adjoining edges $a'$ and $b'$ are now trimmed, so as to make a close joint. Solder is then placed along the inside surfaces of the edges $a'$ and $b'$, forming the inwardly-projecting solder ridges $a^2$ and $b^2$, as shown in Fig. 3. The solder ridges are now trimmed to allow the edges $a'$ and $b'$ of the two parts to come together, as is shown in Fig. 4. The two parts $a$ and $b$ are then wound with wire or are otherwise secured together. The usual liquid flux is now applied to the inner and outer joints, and the same are subjected to heat to melt the solder sufficiently to unite the two parts together. Some of the solder may partly enter the joints, but will not be visible at the other side if the parts $a$ and $b$ are properly fitted together, and the two parts will be firmly secured together by the united solder rings $c$, which extend on the inside along the two joints, as is shown in Fig. 5.

By this construction a highly-ornamented bracelet may be made cheaply of plated sheet metal or stock-plate, presenting to view the plating of precious metal in which when properly finished the joints will not be visible.

Having thus described my invention, I claim as new and desire to secure by Letters Patent—

In a bracelet, the combination with the halves $a$ and $b$ formed, preferably, of inferior sheet metal plated with precious metal, of the solder ridges $a^2$ and $b^2$ united by heat so as to form the rings $c\ c$ overlapping the joints, whereby no raw edges, or solder, are exposed to view, as described.

In witness whereof I have hereunto set my hand.

WILLIAM H. SAART.

Witnesses:
W. H. WILSON,
A. G. SAART.